United States Patent
Isom (10) Patent No.: US 10,604,187 B2
(45) Date of Patent: Mar. 31, 2020

(54) SPRINT CAR SAFETY BLOCK

(71) Applicant: Gary Isom, Overland Park, KS (US)

(72) Inventor: Gary Isom, Overland Park, KS (US)

( * ) Notice: Subject to any disclaimer, the term of this patent is extended or adjusted under 35 U.S.C. 154(b) by 145 days.

(21) Appl. No.: 15/796,366

(22) Filed: Oct. 27, 2017

(65) Prior Publication Data

US 2018/0215415 A1     Aug. 2, 2018

Related U.S. Application Data

(60) Provisional application No. 62/499,578, filed on Jan. 30, 2017.

(51) Int. Cl.
| | | |
|---|---|---|
| *B62D 21/15* | (2006.01) | |
| *B62D 23/00* | (2006.01) | |
| *B62D 21/18* | (2006.01) | |
| *B62D 65/02* | (2006.01) | |
| *C08J 9/00* | (2006.01) | |
| *C09D 175/02* | (2006.01) | |
| *C08J 9/36* | (2006.01) | |
| *B60N 2/015* | (2006.01) | |
| *B60N 2/24* | (2006.01) | |

(52) U.S. Cl.
CPC ............ *B62D 21/15* (2013.01); *B60N 2/015* (2013.01); *B60N 2/24* (2013.01); *B62D 21/183* (2013.01); *B62D 23/005* (2013.01); *B62D 65/024* (2013.01); *C08J 9/00* (2013.01); *C08J 9/365* (2013.01); *C09D 175/02* (2013.01); *C08J 2325/06* (2013.01); *C08J 2375/02* (2013.01); *C08J 2475/00* (2013.01)

(58) Field of Classification Search
CPC .... B62D 21/15; B62D 21/183; B62D 23/005; B62D 65/024
See application file for complete search history.

(56) References Cited

U.S. PATENT DOCUMENTS

| | | | | |
|---|---|---|---|---|
| 1,697,099 A | * | 1/1929 | Wright | B62D 21/02 180/291 |
| 1,730,598 A | * | 10/1929 | Wright | B60K 17/22 180/349 |
| 1,739,535 A | * | 12/1929 | Wright | B62D 21/04 180/57 |
| 2,563,980 A | * | 8/1951 | Wahlberg | F16C 27/066 384/536 |
| 3,309,759 A | * | 3/1967 | Vittone | B62D 21/10 29/897.2 |
| 3,366,411 A | * | 1/1968 | Vittone | B62D 21/10 296/204 |

(Continued)

FOREIGN PATENT DOCUMENTS

JP        2000280769 A * 10/2000

*Primary Examiner* — Hilary L Gutman
(74) *Attorney, Agent, or Firm* — McKee, Voorhees & Sease, PLC (57) ABSTRACT

Safety blocks can provide two points of contact for a torque tube of a sprint car if it breaks free and begins to move. During impact, safety blocks absorb and transfer energy from the torque tube to the sprint car frame located on the outer face of the safety blocks. Each face of the safety blocks can be manufactured to accommodate any surface irregularity within the sprint car frame. The safety blocks may be inserted into the sprint car from the rear of the sprint car towards the front of the sprint car.

16 Claims, 10 Drawing Sheets

(56) References Cited

U.S. PATENT DOCUMENTS

| | | | | |
|---|---|---|---|---|
| 5,054,842 | A | * | 10/1991 | Ishiwatari ............ B62D 21/183 180/90.6 |
| 2003/0042062 | A1 | * | 3/2003 | Stolfus, II ............... F02N 11/12 180/291 |
| 2004/0129481 | A1 | * | 7/2004 | Stolfus ................... B60K 17/24 180/291 |
| 2004/0195797 | A1 | * | 10/2004 | Nash ........................ B60G 7/02 280/124.136 |
| 2008/0023249 | A1 | * | 1/2008 | Sunsdahl ............. B62D 21/183 180/312 |
| 2013/0175779 | A1 | * | 7/2013 | Kvien ..................... B60G 3/20 280/124.15 |
| 2014/0060953 | A1 | * | 3/2014 | Wetterlund ............ B60K 26/02 180/233 |

\* cited by examiner

SPRINT CAR SAFETY BLOCK

CROSS REFERENCE TO RELATED APPLICATIONS

This application claims priority under 35 U.S.C. § 119 to provisional application Ser. No. 62/499,578, filed Jan. 30, 2017, herein incorporated by reference in its entirety.

FIELD OF THE INVENTION

The invention relates generally to a device that absorbs and transfers energy from a sprint car torque tube to the sprint car frame. More specifically, but not exclusively, the invention relates to a device made from hi-density foam coated in a protective polyurea shell.

BACKGROUND OF THE INVENTION

Attached to the axle/rear end of a sprint car is a torque tube (a driveshaft containment tube generally three inches in diameter). The torque tube connects the axle/rear end assembly to the chassis. Within the tube is the driveshaft that transfers the motor's power output to the rear end. One end of the torque tube is bolted on the rear end housing that contains the axle and gears. The motor end of the torque tube is connected to a "motor plate" which allows for vertical movement. The motor plate is a flat plate that is bolted to the chassis in front of the driver's feet. It is also bolted to the motor. Connecting the torque tube to the motor plate is a ball and socket arrangement.

As the rear wheels are being rotated forward by the motor via the driveshaft the torque tube is connected to the rear end forcing the front of the torque tube upwards. This is what causes the chassis of sprint cars rising up when the driver is on the gas. The torque tube is driving the motor plate and everything else attached to it upward. Thus, as the motor plate is driven upward, an equal reaction is that the rear end assembly is driven downward causing more traction or friction between the tires and the ground. A failure can occur if the inter-related drivetrain linkages cannot move freely in relation to each other within the torque tube area, such as when an accident occurs. If a failure occurs, then the desirable upward forces are spread out in different directions instead of in the designed direction. This will force the torque tube sideways as well as upwards and potentially injure the driver.

When sprint cars are involved in crashes, the torque tube will most likely break free from either the motor or the axle/rear end. While racing at Southern Iowa Speedway, NASCAR champion Tony Stewart hit the wheel of a stalled sprint car on the track with his sprint car, causing his sprint car to flip before coming to a rest. The torque tube pierced his lower right leg, breaking his tibia and fibula.

Current systems which attempt to control the movement of the torque tube are generally ineffective or cumbersome. For example, some systems attach directly to the torque tube and do not integrate well with the suspension system of the sprint car. These systems generally allow for movement during a crash and limit the systems to a single pivot point of control.

Therefore, it is a primary object of the invention to improve on or overcome the deficiencies in the art.

It is an object of the invention to provide a device for absorbing and transferring energy.

It is another object of the invention to provide a device that fits securely into the chassis frame of a sprint car.

It is another object of the invention to improve the safety of a driver of a sprint car.

It is another object of the invention to provide a device that is durable.

It is another object of the invention to provide a device that can be easily installed.

It is another object of the invention to provide a device that is cost-effective.

These or other objects, features, and advantages of the invention will become apparent in the specification, claims, and drawings. The invention is not to be limited to or by these objects, features and advantages. No single embodiment of the invention need provide each and every object, feature, or advantage.

BRIEF SUMMARY OF THE INVENTION

According to aspects of the disclosure, a system for absorbing or transferring energy comprises a vehicle frame having a footwell, a torque tube positioned near the footwell, and a first safety block preventing the torque tube from moving into the footwell during torque tube failure. The first safety block may be polygonal shaped, have at least six faces, be made of hi-density foam, and have a protective coating made of polyurea. The hi-density foam may be ASTM C578 Type I, II, VIII, IX, XIV, or XV. The protective coating may be LINE-X® XS-100. The system may also have a second safety block that aids in preventing the torque tube from moving into the footwell during torque tube failure. The first and second safety blocks may be mirror images of one another. The first safety block may have a shifter cable recessed area that allows a shifter cable to move freely within the first safety block such that the shifter cable has unrestricted access to a differential assembly. The first safety block may have at least one recessed area that aids in securing the first safety block to the vehicle frame. The system may also include a torque tube safety strap. The first safety block may provide for at least two points of contact during torque tube failure. The vehicle frame may comprise a chassis and a driver cockpit. The torque tube may engage a torque ball tube through a torque ball hoop. The first safety block may be configured to absorb and transfer energy from the torque tube to the vehicle frame. The system may also include a driver's seat. The driver's seat may be attached to a seat bar. The first safety block may be engagingly mated to the seat bar. The vehicle may be a sprint car.

According to aspects of the disclosure, a method of installing a device for preventing injury to a driver on a sprint car may comprise providing the system disclosed above and inserting the first safety block from the rear of the sprint car towards the front of the sprint car.

DETAILED DESCRIPTION

The following definitions and introductory matters are provided to facilitate an understanding of the present invention.

The singular terms "a," "an," and "the" include plural referents unless context clearly indicates otherwise. Similarly, the word "or" is intended to include "and" unless the context clearly indicate otherwise. The word "or" means any one member of a particular list and also includes any combination of members of that list.

Reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as left, right, vertical, horizontal, top, bottom, front, back, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

Various embodiments of the invention will be described in detail with reference to the drawings, wherein like reference numerals represent like parts throughout the several views.

FIG. 1 and FIG. 2 show left-side and right-side safety blocks 13, 14.

In the embodiment shown, left-side safety block 13 is polygonal shaped and has six faces: a top face 15, bottom face 17, back face 19, outside (left) face 21, inside (right) face 23, and front face 25. Similarly, right-side safety block 14 is also polygonal shaped and has six sides or faces: a top face 16, bottom face 18, back face 20, inside (left) face 22, outside (right) face 24, and front face 26. The present disclosure also contemplates that any number of faces can be used for left-side and right-side safety blocks 13, 14, that the faces may take any known (including regular and irregular) or otherwise intuitive shape, and that each individual face does not need to exist in a single plane (e.g., the use of concave or convex faces is contemplated).

A first left-side recessed area 90 allows left-side safety block 13 to fit under seat bar 54 and a second left-side recessed area 92 allows safety block 13 to fit over left-side diagonal cross brace 98. Likewise, a first right-side recessed area 94 allows right-side safety block 14 to fit under seat bar 54 and a second right-side recessed area 96 allows right-side safety block 14 to fit over right-side diagonal cross brace 100. A shifter cable recessed area 66 allows shifter cable 64 to move freely within right-side safety block 14. Safety blocks 13, 14 are designed to be inserted from the rear of the sprint car towards the front of the sprint car.

Safety blocks 13, 14 may be produced from molded polystyrene foam insulation and a spray on polyurea/polyurethane coating. The type of foam insulation used may be ASTM C578 Type I, II, VIII, IX, XIV, or XV; the foam may have a compressive strength of 10 psi, 13 psi, 15 psi, 25 psi, 40 psi, or 60 psi; and the foam may have a flame spread index less than 25 and a smoke developed index less than 450 per ASTM E84/UL723. A foam product such as FOAM-CONTROL PLUS+ manufactured by ACH Foam Technologies may be preferred. The spray on polyurea/polyurethane coating is generally a two-component, high performance aromatic polyurea/polyurethane hybrid spray elastomer system zero VOC (Volatile Organic Compounds) and is 100% solid. A polyurea/polyurethane coating such as LINE-X® XS-100 manufactured by LINE X® protective coatings may be preferred. Safety blocks 13, 14 will be constantly subjected to heat, dirt, oil, methanol, and water. Therefore, safety blocks 13, 14 must be able to withstand this environment without degradation. LINE-X® XS-100 coating provides protection from abrasion, corrosion, impact, resistance to water, and chemicals, and thus increases product durability.

The present disclosure contemplates that left-side and right-side safety blocks 13, 14 may form one integral safety block 10. The present disclosure also contemplates that the left-side and right-side safety blocks 13, 14 may be mirror images of another.

Figure 1A:
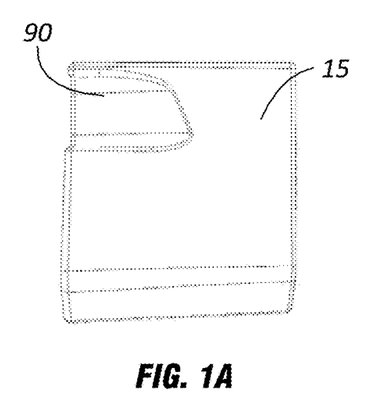
FIG. 1A illustrates a top view of a left-side safety block.
Figure 1B:
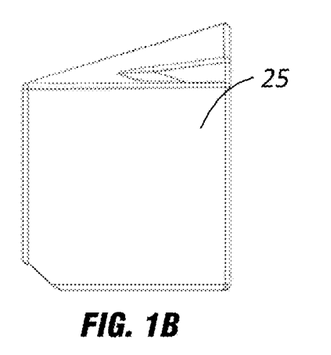
FIG. 1B illustrates a front view of the left-side safety block of FIG. 1A.
Figure 1C:
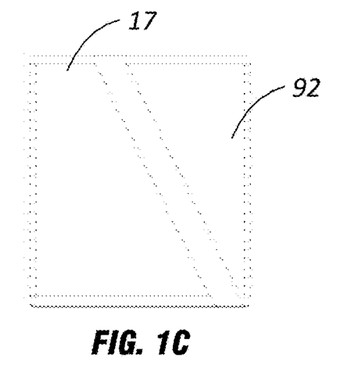
FIG. 1C illustrates a bottom view of the left-side safety block of FIG. 1A.
Figure 1D:
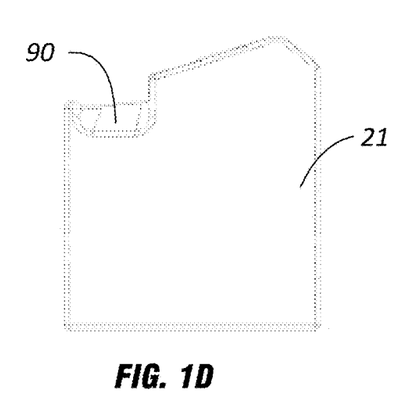
FIG. 1D illustrates an outside (left-side) view of the left-side safety block of FIG. 1A.
Figure 1E:
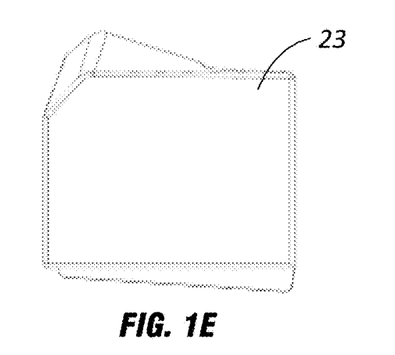
FIG. 1E illustrates an inside (right-side) view of the left-side safety block of FIG. 1A.
Figure 1F:
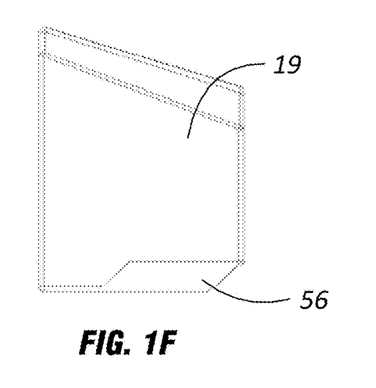
FIG. 1F illustrates a front view of the left-side safety block of FIG. 1A.
Figure 2A:
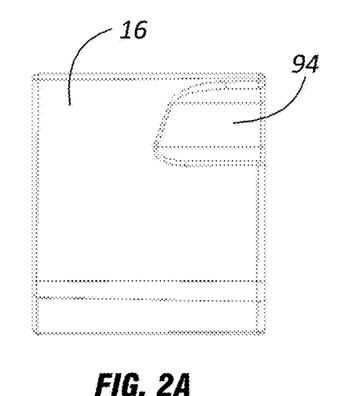
FIG. 2A illustrates a top view of a right-side safety block.
Figure 2B:
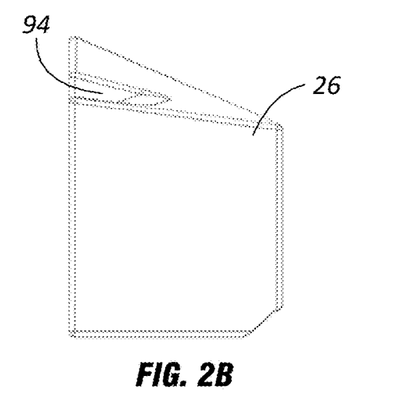
FIG. 2B illustrates a front view of the right-side safety block of FIG. 2A.
Figure 2C:
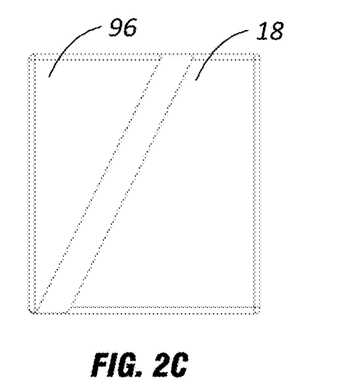
FIG. 2C illustrates a bottom view of the right-side safety block of FIG. 2A.
Figure 2D:
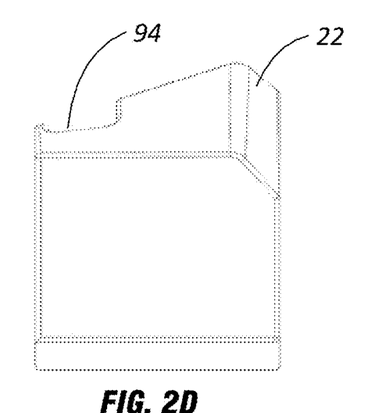
FIG. 2D illustrates an outside (left-side) view of the right-side safety block of FIG. 2A.
Figure 2E:
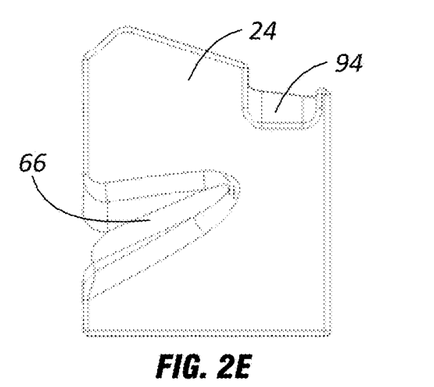
FIG. 2E illustrates an inside (right-side) view of the right-side safety block of FIG. 2A.
Figure 2F:
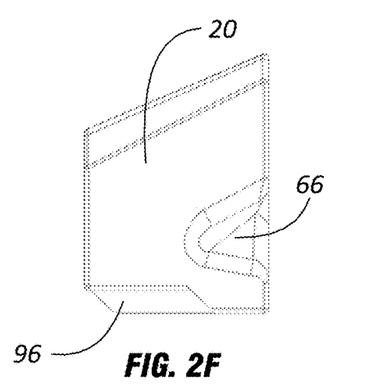
FIG. 2F illustrates a front view of the right-side safety block of FIG. 2A.
Figure 3A:
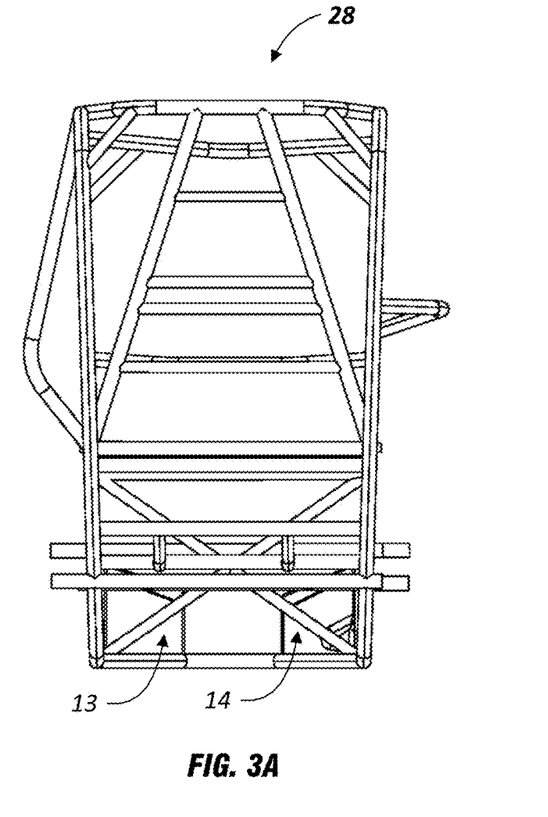
FIG. 3A is a rear view showing a safety block mounted within a sprint car frame, according to aspects of the disclosure.
Figure 3B:
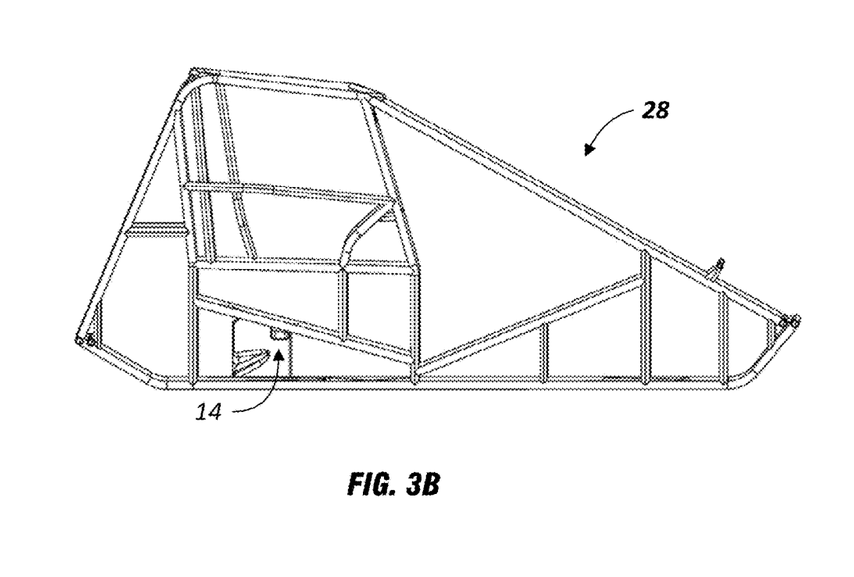
FIG. 3B is a side view showing the safety block of FIG. 3A mounted within a sprint car frame, according to aspects of the disclosure.
Figure 3C:
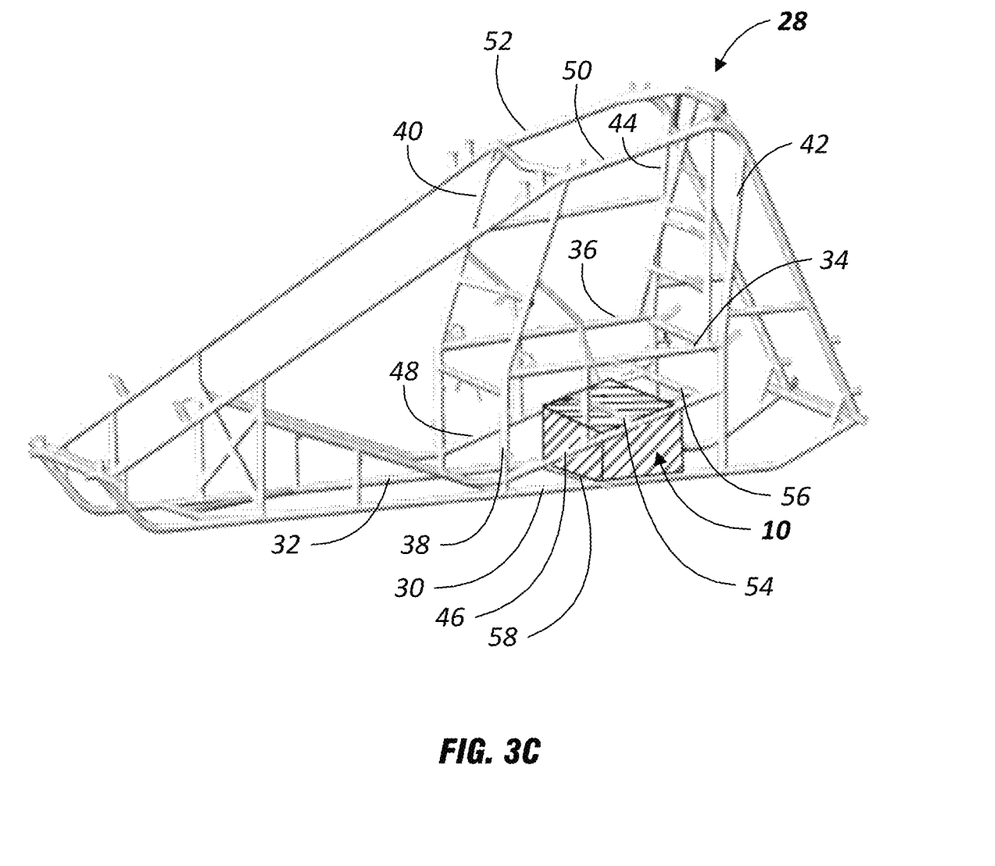
FIG. 3C is a perspective view of the safety block of FIG. 3A mounted within a sprint car frame.

FIG. 3 illustrates a sprint car frame 28 with integrated safety block 10. Sprint car frame 28 includes the chassis of the sprint car and the driver cockpit 88 of the sprint car and is comprised of tubing to support the drive train systems and driver (not shown). Safety block 10 is positioned below the driver's seat 76 (driver's seat 76 shown in FIG. 8). The left side of driver cockpit 88 is comprised of a generally horizontal left bottom rail 30. Protruding upwardly from left bottom rail 30 are generally vertical left-side front roll cage upright 38 and left-side rear roll cage upright 42. Left-side front and rear roll cage uprights 38, 42 mate to left-side top rail 50. A left-side upper rail 34 which is generally parallel to left-side bottom rail 30 and left-side upright cross brace 46 completes the left side of driver cockpit 88. The right side of driver cockpit 88 is comprised of generally horizontal right bottom rail 32. Protruding upwardly from right bottom rail 32 are generally vertical right-side front roll cage upright 40 and right-side rear roll cockpit upright 44. Right-side front and rear roll cage uprights 40, 44 mate to right-side top rail 52. A right-side upper rail 36 which is generally parallel to right-side bottom rail 32 and right-side upright cross brace 48 completes driver cockpit 88. A seat bar 54 mates near the midpoint of left and right-side uprights cross braces 46, 48. Main cross member 56 mates towards the rear of left and right-side uprights cross braces 46 and 48. The chassis of the sprint car frame 28 may have different frame component layouts per the individual driver or chassis builder and not be reflected here.

Figure 4:
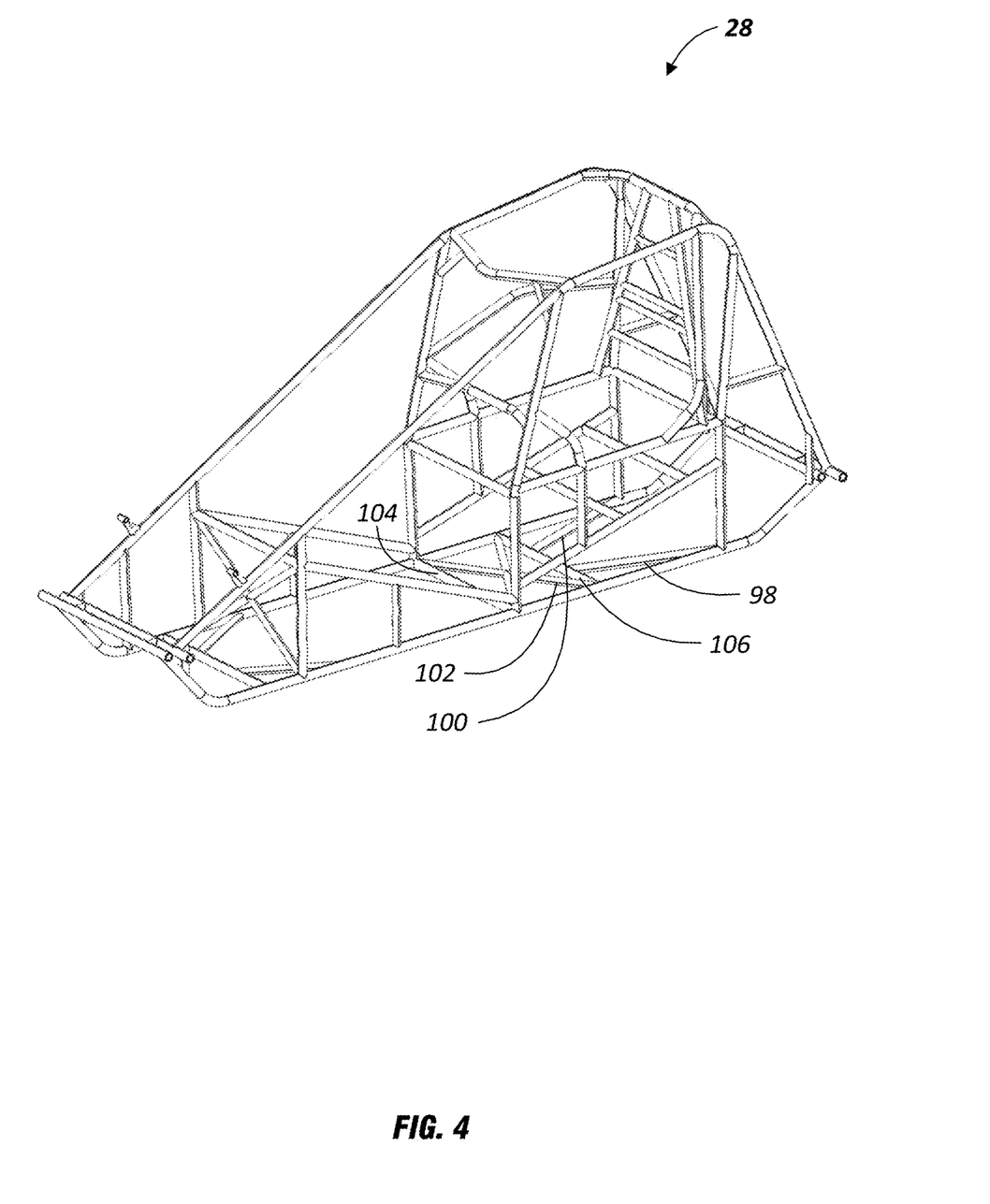
FIG. 4 is a perspective view of a sprint car frame of FIG. 3A with the safety block removed.

FIG. 4 is a perspective view of a sprint car frame 28 without safety blocks 10, 13, 14. FIG. 4 shows x-shaped cross brace 102 which is sandwiched between front, bottom and rear, bottom cross braces 104, 106. Left brace 98 attaches to left-side bottom rail 30 and cross brace 106. Right brace 100 attaches to right-side bottom rail 32 and cross brace 106.

Figure 5:
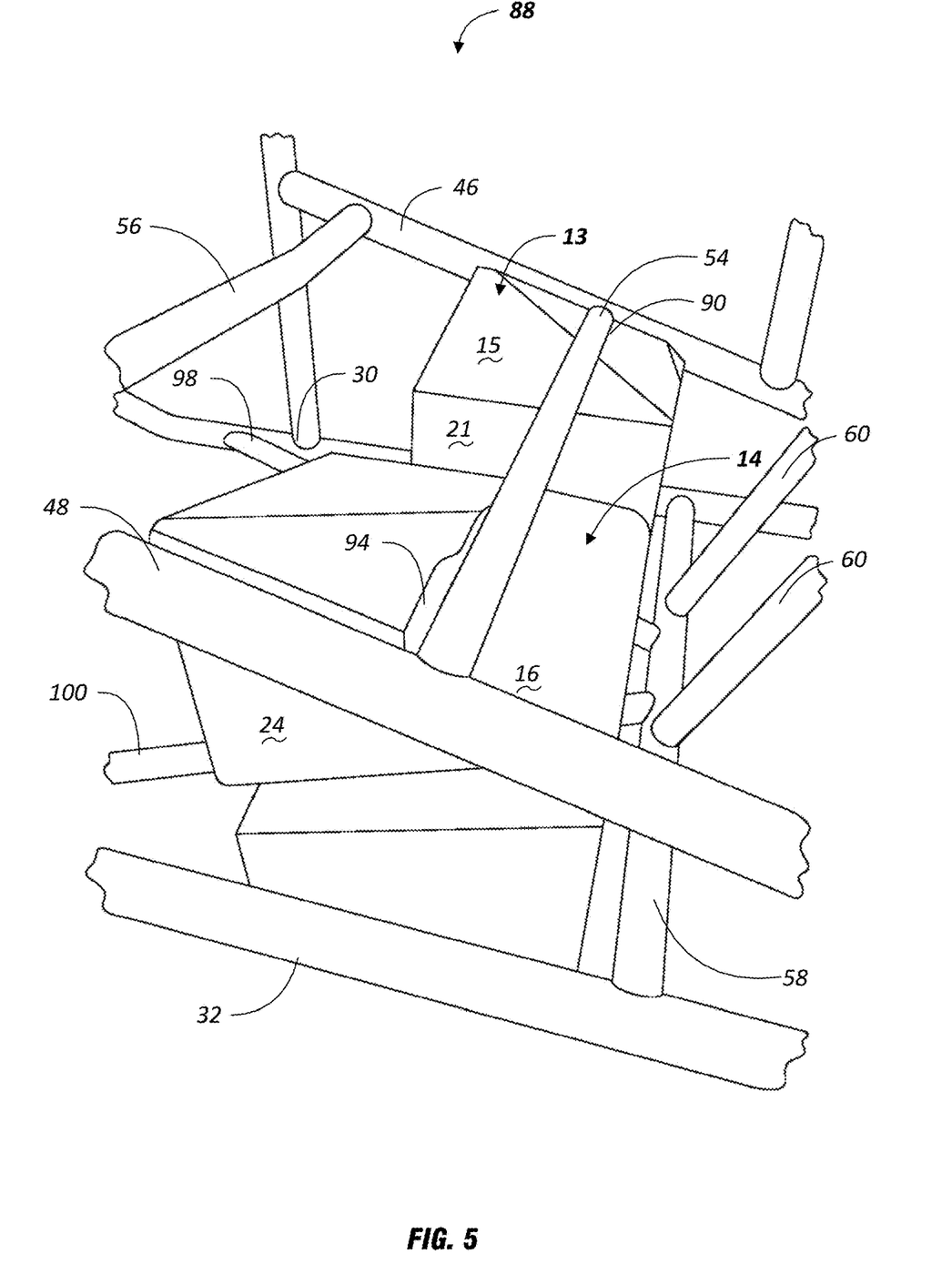
FIG. 5 is a top, right-side perspective view of the safety blocks mounted within a sprint car frame.

FIG. 5 is a top, right-side perspective view of sprint car frame 28. FIG. 5 shows left and right safety blocks 13, 14 placed within sprint car frame 28. Beneath seat bar 54 are left and right top faces 15, 16 of safety blocks 13, 14. The first left-side recessed area 90 and first right-side recessed area 94 allow seat bar 54 to fit within safety blocks 13, 14. Left and right-side uprights cross braces 46 and 48 meet left and right outside surfaces 21, 22 of safety blocks 13, 14. Also shown in FIG. 5 are main cross member 56 and torque tube hoop 60. Torque tube hoop 60 attaches to torque tube lower cross member 58. Torque tube lower cross member 58 is attached to left and right-side bottom rails 30, 32. Left and right-side diagonal bottom cross brace members 98 and 100 can be seen interfacing with safety blocks 13, 14 via second recessed areas 92, 96. Left and right-side uprights cross braces 46 and 48 meet left-side and right-side outside surfaces 23 and 24 of safety blocks 13, 14.

Figure 6:
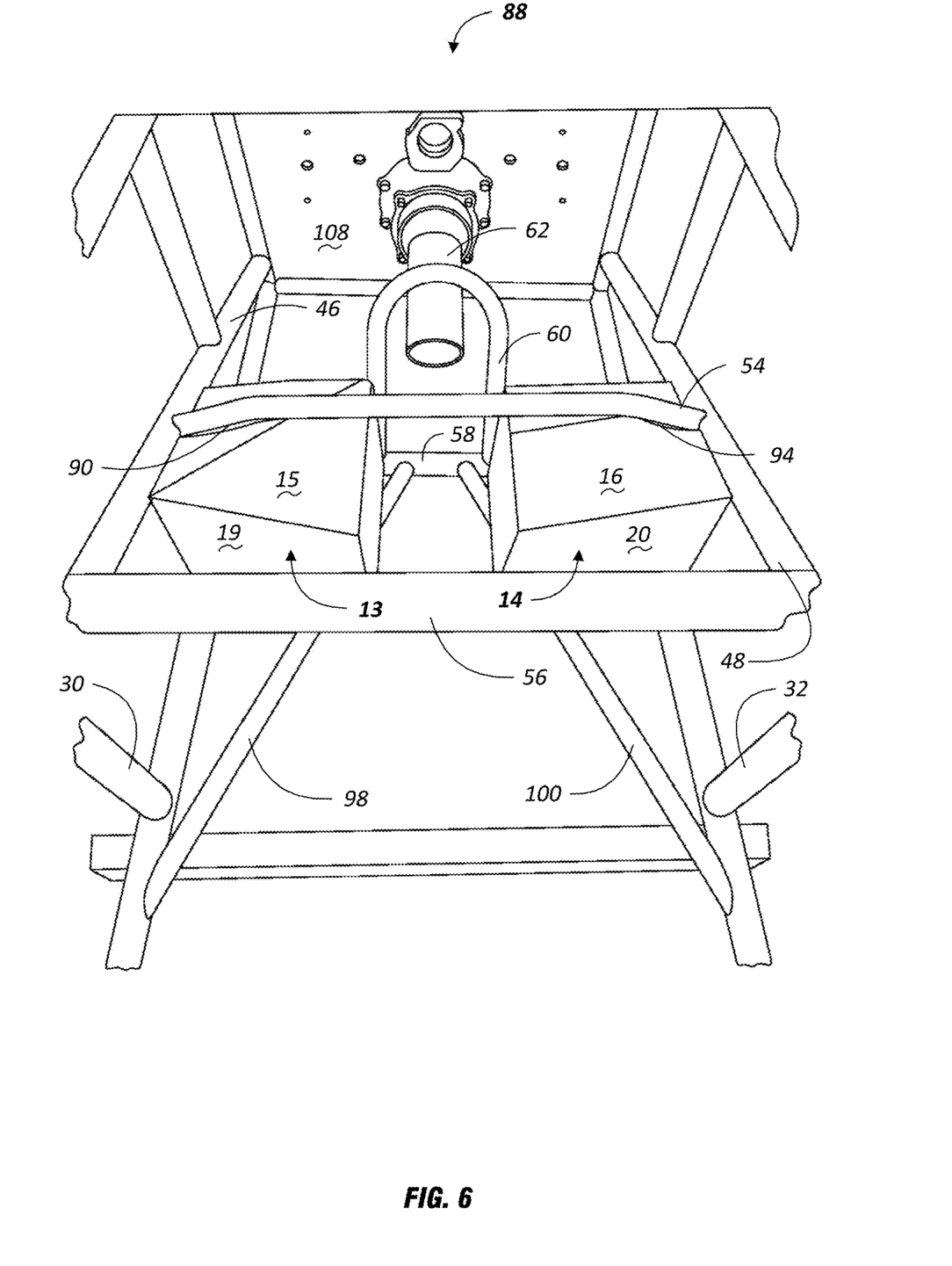
FIG. 6 is a top, rear-looking perspective view of the safety blocks mounted within the sprint car frame of FIG. 5.

FIG. 6 is a top perspective view looking from the rear of the sprint car towards the front of sprint car. FIG. 6 shows left-side and right-side safety blocks 13, 14 placed within the sprint car tube frame 28. Beneath seat bar 54 are left and right top faces 15, 16 of safety blocks 13, 14. First left-side recessed area 90 and first right-side recessed area 94 allow seat bar 54 to fit within safety blocks 13, 14. Left and right rear face surfaces 19, 20 are shown in FIG. 6 just behind main cross member 56. Left-side and right-side uprights cross braces 46, 48 meet left-side and right-side top surfaces 15, 16 of safety blocks 13, 14. Also shown in FIG. 6 are main cross member 56 and torque tube hoop 60. Torque ball tube 62 may engage with torque tube 78 (torque tube 78 shown in FIG. 7 and FIG. 8) through torque tube hoop 60. Torque ball tube 62 is mounted to rear motor mount 108. The torque tube hoop 60 attaches to torque tube lower cross member 58. Torque tube lower cross member 58 is attached to left-side and right-side bottom rails 30, 32. FIG. 6 also shows left-side and right-side diagonal bottom cross brace members 98, 100.

Figure 7:
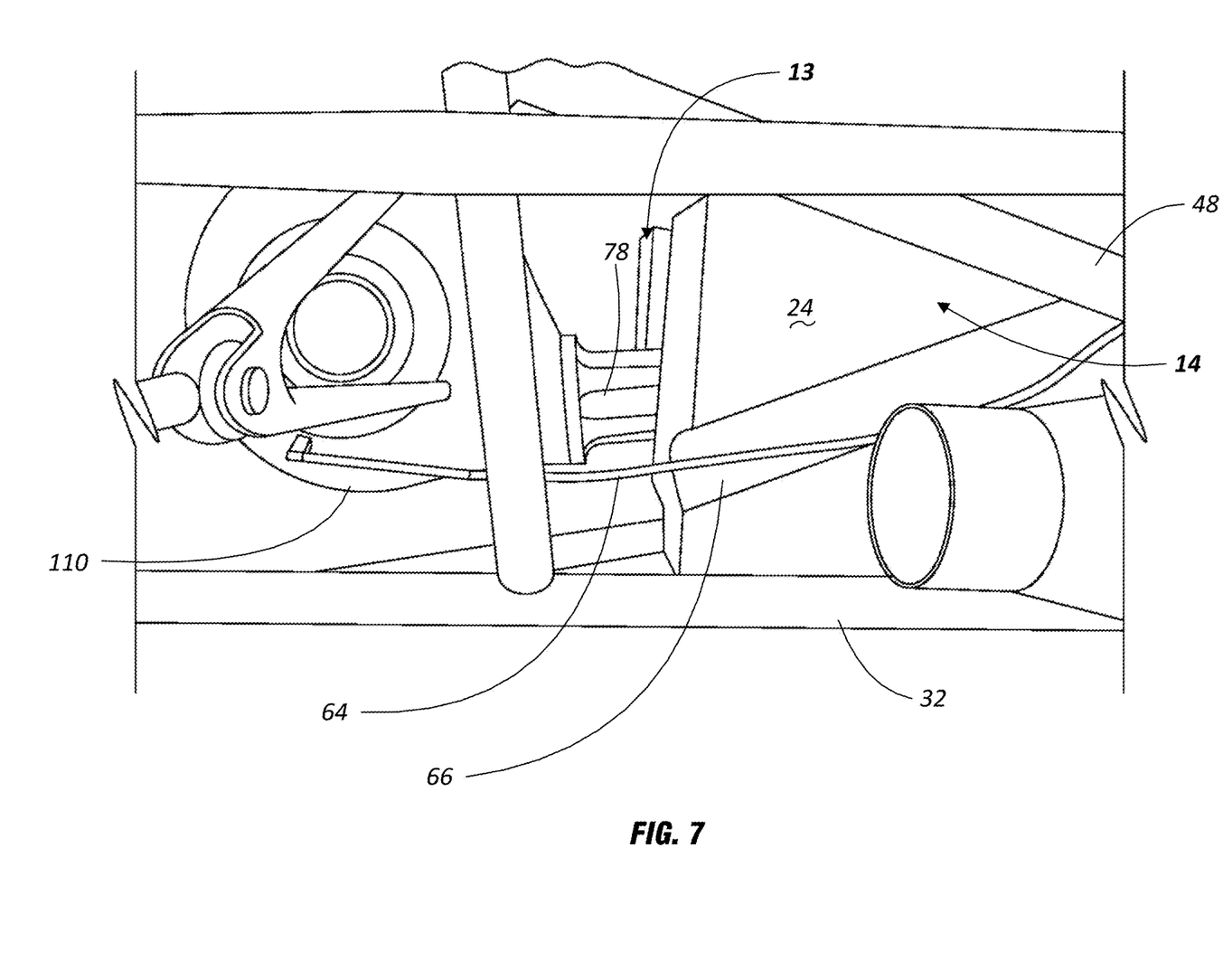
FIG. 7 is a bottom, right-side view of the safety blocks mounted within the sprint car frame of FIG. 5.

FIG. 7 is a bottom, right-side view of safety blocks 13, 14 mounted within the sprint car frame 28 of FIG. 5. Right-side bottom rail 32, right-side diagonal bottom cross brace member 100, and right-side upright cross brace member 48 are shown in relationship to torque tube 78 and right-side safety block 14. Right-side outside face 24 of right-side safety block 14 has a shifter cable recessed area 66 which allows shifter cable 64 unrestricted access to differential assembly 110.

Figure 8:
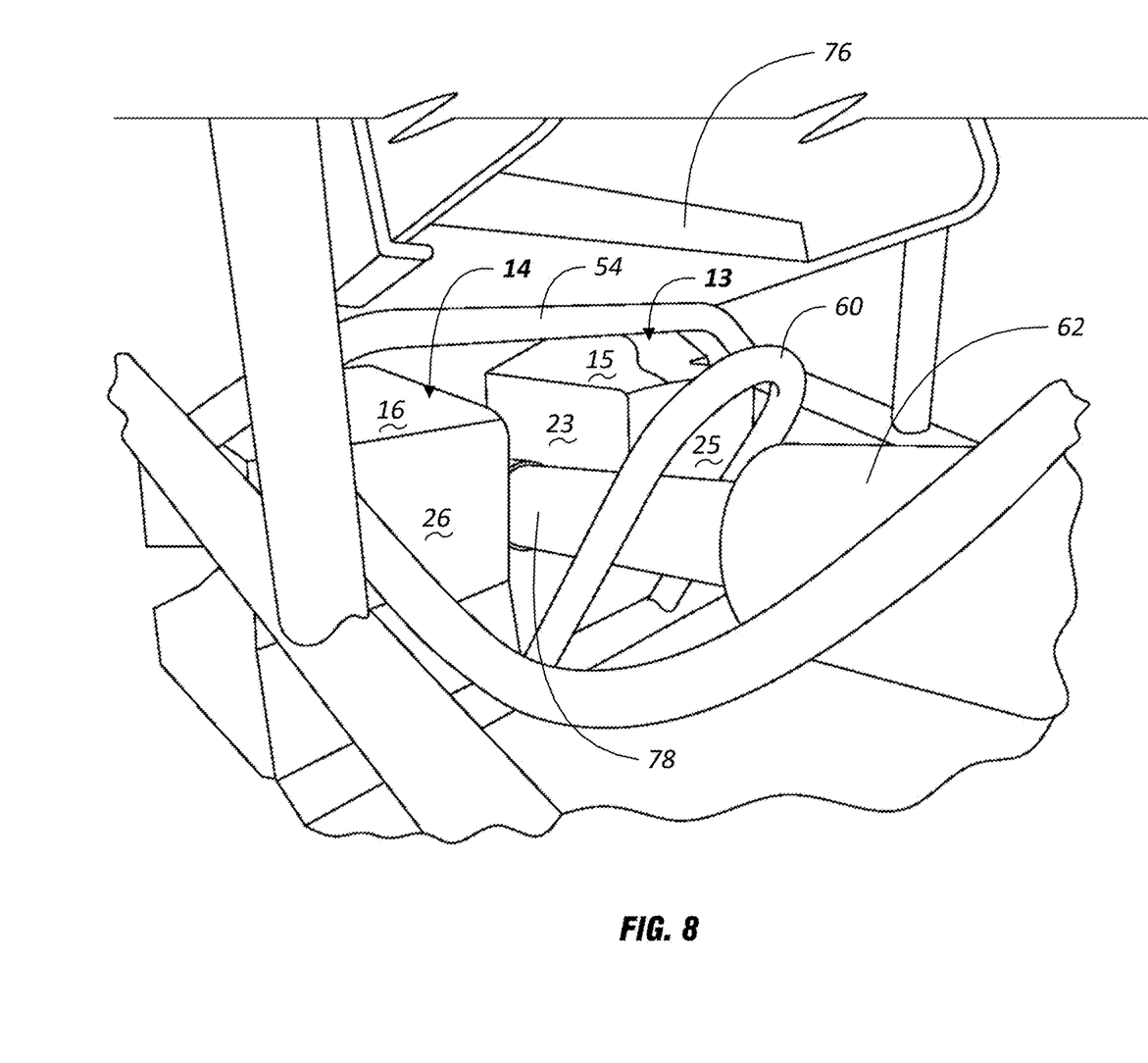
FIG. 8 is a bottom, right-side, and rear-looking perspective view of the safety blocks mounted within the sprint car frame of FIG. 5.

FIG. 8 is a bottom, right-side prospective view looking from the front of the sprint car back towards driver seat 76. Safety blocks 13, 14 are bisected by torque tube 78. Torque tube 78 connects to torque ball tube 62. Driver's seat 76 is attached to seat bar 54. Seat bar 54 is engagingly mated to top faces 15, 16 of safety blocks 13, 14. FIG. 8 also shows the position of front faces 25, 26, as well as left-side inside face 23, with respect to torque tube 78.

Figure 9A:
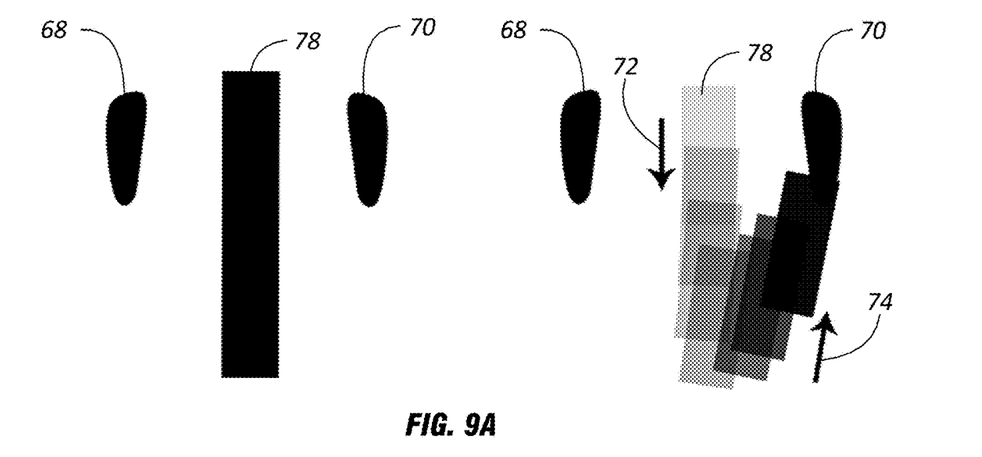
FIG. 9A is a block diagram illustrating torque tube failure within a sprint car without the use of safety blocks or safety straps.

The left panel of FIG. 9A illustrates the foot position of a driver's left foot 68 and right foot 70 with respect to the position of torque tube 78. Torque tube 78 may be positioned near (i.e. less than twelve inches away from) the footwell of the sprint car frame 28 such that torque tube 78 is centered between where a driver's feet 68, 70 would be positioned during operation of the sprint car. The torque tube 78 may also be centered slightly below or above the foot position of the driver's feet 68, 70. FIG. 9A shows a sprint car that does not utilize a torque tube safety device or system. The right panel of FIG. 9A illustrates the potential directions of energy during a collision of the sprint car. Rearward energy 72 is shown moving away from left foot 68 and then potentially forwards and sideways towards right foot 70. Thus, FIG. 9A illustrates how a driver may be injured, e.g., by breaking a foot, ankle or leg during torque tube failure.

Figure 9B:
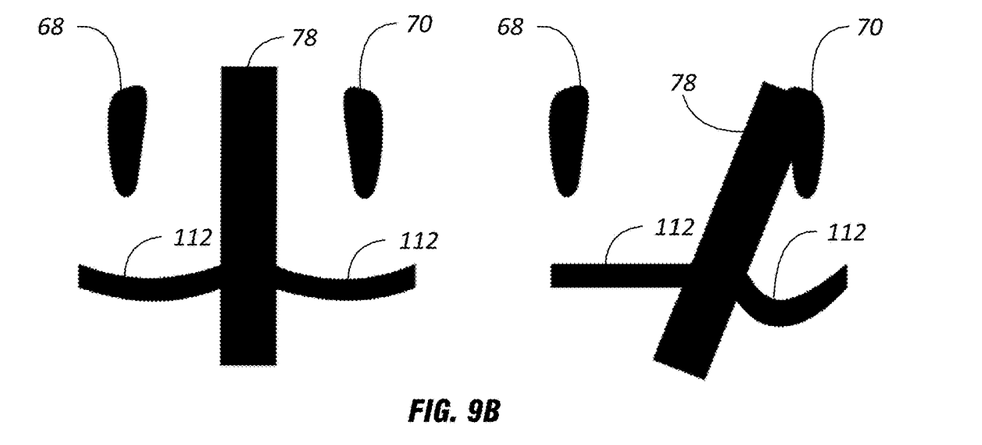
FIG. 9B is a block diagram illustrating torque tube failure within a sprint car using safety straps.

The left panel of FIG. 9B shows a sprint car which utilizes a torque tube safety strap 112 before a collision. The right panel of FIG. 9B illustrates the potential direction of energy during a collision. As shown in FIG. 9B, the torque tube 78 pivots away from left foot 68 and towards right foot 70. Torque tube safety strap 112 has some slack which allows torque tube 78 to contact right foot 70. The strap 112 is unable to absorb and transfer all of the energy away from the driver. Thus, the driver may still be injured, e.g., by breaking a foot, ankle or leg during torque tube failure.

Figure 9C:
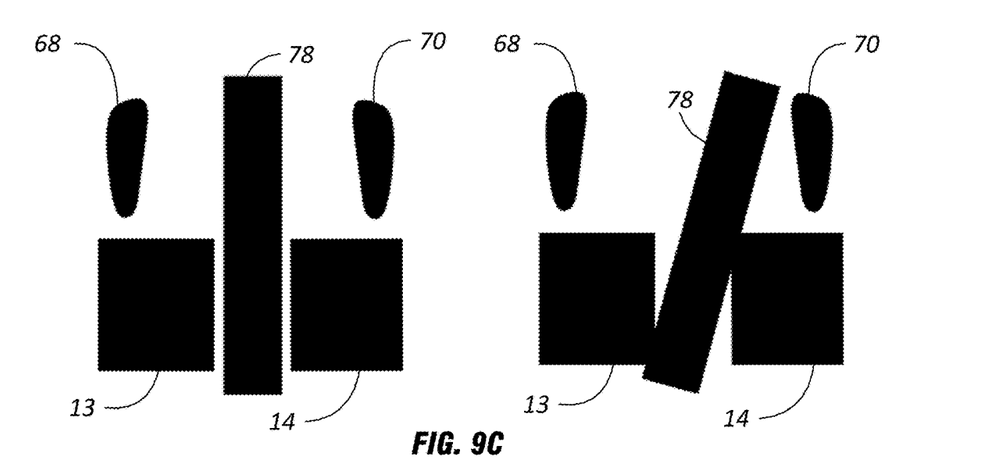
FIG. 9C is a block diagram illustrating torque tube failure within a sprint car using safety blocks.

The left panel of FIG. 9C illustrates the foot position of a drivers feet 68, 70 in relationship to torque tube 78 which utilizes safety blocks 13, 14 before a collision. The right panel of FIG. 9C illustrates the torque tube 78 pivoting away from left foot 68 during a collision causing torque tube 78 to move towards right foot 70. This time, right-side safety block 14 absorbs and transfers the energy of torque tube 78 into the sprint car frame. Thus, FIG. 9C illustrates how safety blocks 10, 13, 14 improve the state of the art and prevent a driver from becoming injured.

The present disclosure contemplates safety blocks 10, 13, 14 being used in conjunction with a torque tube safety strap 112.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A system for absorbing or transferring energy, comprising:
   a vehicle frame having a footwell;
   a torque tube positioned near the footwell; and
   a first safety block made of hi-density foam, the first safety block preventing the torque tube from moving into the footwell during torque tube failure.

2. The system of claim 1 wherein the first safety block is polygonal shaped and has at least six faces.

3. The system of claim 1 wherein the hi-density foam is ASTM C578 Type I, II, VIII, IX, XIV, or XV.

4. The system of claim 1 wherein the first safety block has a protective coating made of polyurea.

5. The system of claim 1 further comprising a second safety block that aids in preventing the torque tube from moving into the footwell during torque tube failure.

6. The system of claim 5 wherein the first and second safety blocks are mirror images of one another.

7. The system of claim 1 wherein the vehicle frame comprises a chassis and a driver cockpit.

8. The system of claim 1 wherein the first safety block is configured to absorb and transfer energy from the torque tube to the vehicle frame.

9. The system of claim 1 further comprising a driver's seat.

10. The system of claim 9 wherein the driver's seat is attached to a seat bar.

11. A sprint car comprising the system of claim 1.

12. A system for absorbing or transferring energy, comprising:
    a vehicle frame having a footwell;
    a torque tube positioned near the footwell; and
    a first safety block preventing the torque tube from moving into the footwell during torque tube failure, wherein the first safety block has a shifter cable recessed area that allows a shifter cable to move freely within the first safety block such that the shifter cable has unrestricted access to a differential assembly.

13. A system for absorbing or transferring energy, comprising:
    a vehicle frame having a footwell;
    a torque tube positioned near the footwell; and
    a first safety block preventing the torque tube from moving into the footwell during torque tube failure, wherein the first safety block has at least one recessed area that aids in securing the first safety block to the vehicle frame.

14. A system for absorbing or transferring energy, comprising:
    a vehicle frame having a footwell;
    a torque tube positioned near the footwell;
    a first safety block preventing the torque tube from moving into the footwell during torque tube failure; and
    a torque tube safety strap.

15. A system for absorbing or transferring energy, comprising:
    a vehicle frame having a footwell;
    a torque tube positioned near the footwell; and
    a first safety block preventing the torque tube from moving into the footwell during torque tube failure, wherein the torque tube engages a torque ball tube through a torque ball hoop.

16. A system for absorbing or transferring energy, comprising:
    a vehicle frame having a footwell;
    a driver's seat attached to a seat bar;
    a torque tube positioned near the footwell; and
    a first safety block preventing the torque tube from moving into the footwell during torque tube failure, wherein the first safety block is engagingly mated to the seat bar.

* * * * *